United States Patent [19]

Nishii

[11] Patent Number: 4,869,560
[45] Date of Patent: Sep. 26, 1989

[54] HYDRAULIC BRAKING SYSTEM FOR A VEHICLE

[75] Inventor: Michiharu Nishii, Toyota, Japan

[73] Assignee: Aisin Seiki Kabushiki Kaisha, Kariya, Japan

[21] Appl. No.: 200,449

[22] Filed: May 31, 1988

[30] Foreign Application Priority Data

May 29, 1987 [JP] Japan .................... 62-084823[U]

[51] Int. Cl.$^4$ ............................................. B60T 8/02
[52] U.S. Cl. .................................... 303/114; 303/115; 303/116
[58] Field of Search ............... 303/113, 114, 115, 116, 303/119, 110

[56] References Cited

U.S. PATENT DOCUMENTS

| | | | |
|---|---|---|---|
| 4,523,792 | 6/1985 | Belart et al. | 303/116 X |
| 4,565,411 | 1/1986 | Seiber | 303/110 |
| 4,728,155 | 3/1988 | Resch | 303/115 X |
| 4,741,581 | 5/1988 | Krohn | 303/115 |
| 4,750,788 | 6/1988 | Seibert et al. | 363/114 X |
| 4,753,074 | 6/1988 | Belart et al. | 303/114 |

FOREIGN PATENT DOCUMENTS 1542330  3/1979  United Kingdom .

*Primary Examiner*—Andres Kashnikow
*Assistant Examiner*—Matthew C. Graham
*Attorney, Agent, or Firm*—Burns, Doane, Swecker & Mathis

[57] ABSTRACT

A hydraulic braking system for a vehicle includes a hydraulic power pressure source which produces a hydraulic power pressure and a hydraulic braking pressure generator which generates a hydraulic pressure in response to the operation of a brake pedal. A regulator valve is provided for regulating, in dependence upon the operation of the pressure generator, the pressure which is supplied from the pressure source and for supplying a regulated hydraulic pressure to an output hydraulic pressure passage. A control valve controls the communication between the generator and a plurality of brake cylinders as well as between the regulator valve and the brake cylinders and between a reservoir and the brake cylinders. Also, a changeover valve is provided which, in a first position, blocks communication between the hydraulic pressure source and the output pressure passage of the regulator valve, and which, in a second position, introduces pressure supplied from the pressure source to the output pressure passage.

14 Claims, 3 Drawing Sheets

HYDRAULIC BRAKING SYSTEM FOR A VEHICLE

BACKGROUND OF THE INVENTION

1. Field of the Invention

This invention relates to a hydraulic braking system for use in an automotive vehicle, and more particularly to a hydraulic braking system in which the wheels of this vehicle are prevented from locking.

2. Description of the Prior Art

An apparatus with a valve means of the type described above is known as a so called anti-skid apparatus which prevents the wheels from locking in braking operation. A typical apparatus of this type is disclosed, for example, in U.K. Pat. No. 1,542,330. In this apparatus, when the wheels are in the locking condition, the communication between the master cylinder as the hydraulic braking pressure generator and the wheel brake cylinders is cut off by the valve means and the communication between the regulator valve and the wheel brake cylinders as well as the communication between the reservoir and the wheel brake cylinders is controlled by the valve means. As a result, the hydraulic pressure in each of the wheel brake cylinders is increased or decreased to effectively prevent the road wheels from locking. During this time, since the hydraulic pressure from the regulator valve does not act to operate the master cylinder, even if fluctuation of the hydraulic of the hydraulic pressure of the regulator valve is caused by intermittent activation of the valve means, the brake pedal is maintained in its depressed position without causing any unpleasant shock thereon. Furthermore, since the hydraulic pressure of the regulator valve is controlled in dependence upon the hydraulic pressure of the master cylinder so as to become lower than the hydraulic pressure in the power hydraulic source at the voluntary value, the control of the anti-locking operation is apt to do.

In accelerating operation, it is necessary to prevent a slip on driven wheels for providing an optimum accelerating performance. However, because the above-mentioned apparatus is not able to generate the hydraulic pressure from the regulator valve when the brake pedal is not operated, it is not able to prevent the slip on driven wheels during starting or accelerating operation. The regulator valve is not provided therein for such a purpose, but a connecting valve may be disposed in a hydraulic passage connecting the hydraulic braking pressure generator to the wheel brake cylinders provided on the driven wheels, at a position upstream of the above-described valve means disposed in the hydraulic passage, as disclosed in U.S. Pat. No. 4,565,411.

According to the hydraulic brake system described above, the wheels are prevented from locking in braking operation by suitably controlling the hydraulic braking pressure applied to the wheel brake cylinders by means of the valve means, and the slip of the driven wheels is prevented during starting or accelerating operation of the vehicle by means of the valve means and the connecting valve which normally interrupts the flow between the wheel brake cylinders of the driven wheels and a pressure accumulator, i.e. the hydraulic power pressure source. In the above-described hydraulic brake system, a single connecting valve may be disposed in he passage connecting the hydraulic braking pressure generator to the wheel brake cylinders of the driven wheels.

However, in the case where a diagonal dual circuit is employed, in which a first passage connects the hydraulic braking pressure generator to one of the wheel brake cylinders of the driven wheels and one of the wheel brake cylinders of the free wheels, and a second passage connects the hydraulic braking pressure generator to the rest of the wheel brake cylinders, the connecting valve must be disposed in each of the first and second passages, as in the case where all of the wheels are driven. In these cases, therefore, at least two sets of the connecting valve are needed to be disposed and a corresponding arrangement of passages is necessary, so that the braking system as a whole becomes costly, large and heavy.

OBJECTS AND SUMMARY OF THE INVENTION

It is, therefore, an object of the present invention to provide a hydraulic braking system for a vehicle which achieves the merits of the above prior art devices without causing a scaling up in the size, weight and cost of the system.

It is another object of the present invention to provide a hydraulic braking system for a vehicle which obtains the above merits and which may be applied to a vehicle with a diagonal dual circuit without any substantial change to the hydraulic braking system with a front-rear dual circuit.

It is a further object of the present invention to provide a hydraulic braking system with a single changeover valve arranged therein, which is commonly applied to all types of vehicles irrespective of their drive system such as a front-drive, a rear-drive or a four wheel-drive system.

To achieve the above objects, and in accordance with the purpose of the invention, as embodied and broadly described herein, the hydraulic braking system for a vehicle comprises:

(a) a hydraulic power pressure source which produces a hydraulic power pressure;

(b) a hydraulic braking pressure generator generating a hydraulic pressure in response to the operation of a brake pedal;

(c) a regulator valve regulating, in dependence upon the operation of the hydraulic braking pressure generator, the hydraulic power pressure which is supplied from the hydraulic power pressure source and supplying a regulated hydraulic pressure to an output hydraulic pressure passage;

(d) a reservoir which stores an amount of hydraulic fluid;

(e) a plurality of wheel brake cylinders for braking respective wheels, which are connected to the hydraulic braking pressure generator, the regulator valve through the output hydraulic pressure passage and the reservoir;

(f) valve means for controlling the communication between the hydraulic braking pressure generator and the wheel brake cylinders, the communication between the regulator valve and the wheel brake cylinders and the communication between the reservoir and the wheel brake cylinders; and (g) a changeover valve which is selectively placed in either of a first operating position for blocking the communication between the hydraulic power pressure source and the output hydraulic pressure passage of the regulator valve, or a second operating position for introducing the hydraulic power pressure which is supplied from the hydraulic power pressure source to the output hydraulic pressure passage of the regulator valve.

BRIEF DESCRIPTION OF THE DRAWING

Additional objects and advantages of the present invention will become more apparent from the following detailed description of preferred embodiments thereof when considered with reference to the attached drawing, in which.

DETAILED DESCRIPTION OF THE PREFERRED EMBODIMENT

Figure 1:
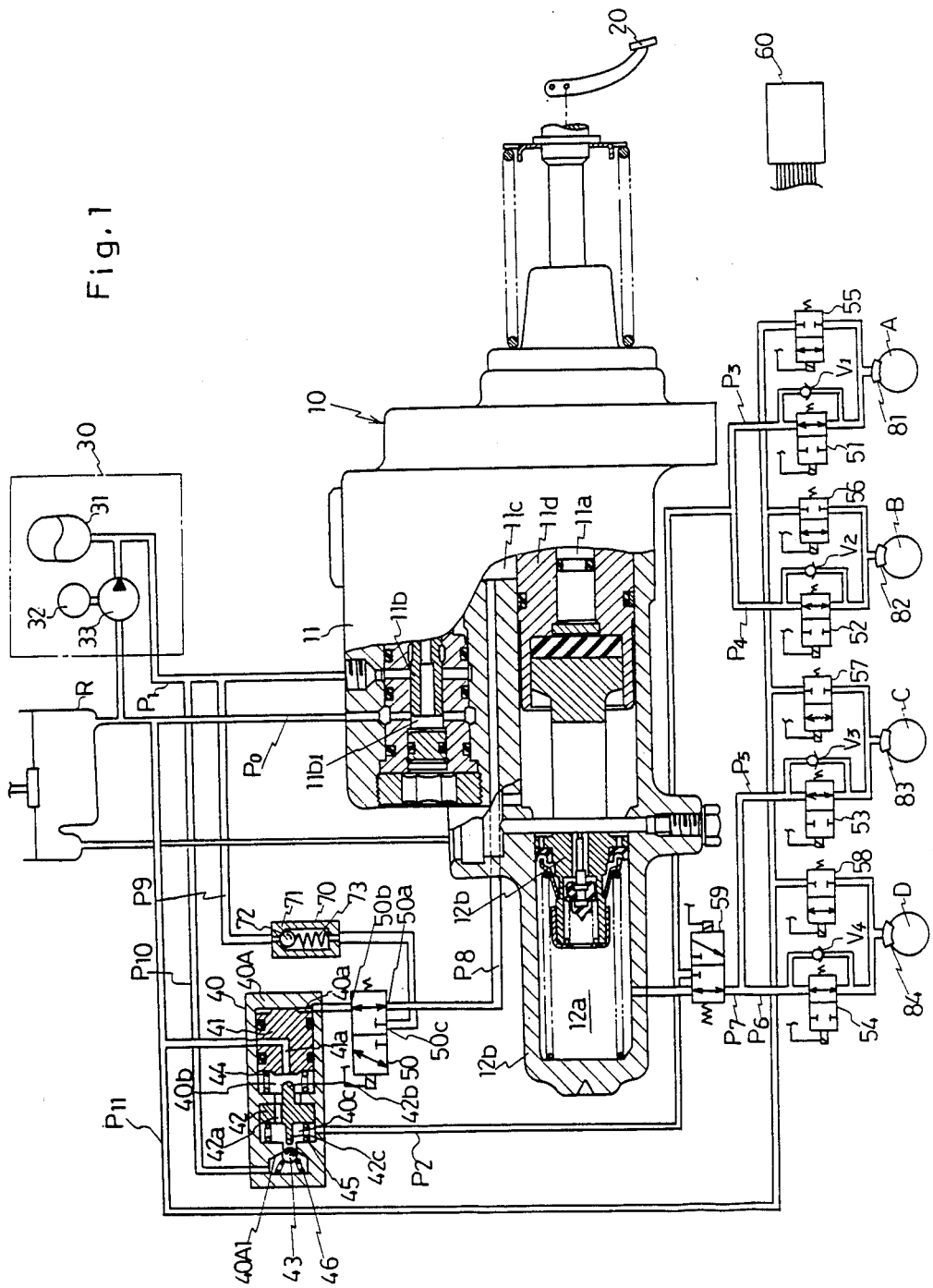
FIG. 1 is a schematic illustration of a hydraulic braking system according to a first embodiment of the present invention.

Preferred embodiments of a hydraulic braking system in accordance with the present invention will be described with reference to the drawing.

Referring to FIG. 1, there is schematically illustrated a hydraulic braking system according to a first embodiment of the present invention, which includes a hydraulic braking pressure generator (hereinafter referred to simply as a pressure generator) 10, a hydraulic power pressure source 30 and a regulator valve 40.

The pressure generator 10 comprises a hydraulic booster 11 of a well known lever operated type and a portless single master cylinder (hereinafter referred to simply as a master cylinder) 12 which are assembled within a common housing. The hydraulic booster 11 includes a plunger 11a, a control valve 11b, a power chamber 11c, a power piston 11d and a lever mechanism (not shown). The power piston 11d is axially slidably disposed in the power chamber 11c and is associated with the plunger 11a which is axially movable within a bore defined in the power piston 11d in response to depression of a brake pedal 20. The control valve 11b comprises a spool valve which is operated by the lever mechanism engaged with the power piston 11d and the plunger 11a. The control valve 11b is arranged to control the communication of the power chamber 11c with the power passage P1 and the drain passage P0 in response to depression of the brake pedal 20. The power chamber 11c is normally communicated with the reservoir R through a passage 11b1 and the drain passage P0 when the brake pedal 20 is in its initial position, i.e. when it is not depressed. When the brake pedal 20 is depressed, the control valve 11b is operated by the sliding movement of the plunger 11a in response to the brake pedal 20, and the hydraulic power pressure in the accumulator 31 is supplied to the power chamber 11c and the hydraulic power pressure supplied from the accumulator 31 is controlled. As a result, a hydraulic pressure is generated in the power chamber 11c and a hydraulic pressure is generated in a pressure chamber 12a of the master cylinder 12 by the sliding movement of the power piston 11d in response to the hydraulic pressure in the power chamber 11c.

The accumulator 31 constitutes the hydraulic power pressure source 30 for generating the hydraulic power pressure along with a fluid pump 33 which is connected to the accumulator 31 and the reservoir R which stores an amount of the hydraulic fluid. The fluid pump 33 is operated by a motor 32 which is actuated by an electric control signal from an electric control device (hereinafter referred to as controller) 60. It is desirable that the fluid pump 33 be connected to the accumulator 31 via a check valve.

The regulator valve 40 is connected to the power chamber 11c of the hydraulic brake booster 11 by way of a passage P8 to be supplied with the fluid under pressure from the power chamber 11c in brake operation. In this embodiment, the hydraulic pressure applied to the regulator valve 40 from the power chamber 11c corresponds with the assist power applied to the master cylinder 12 in braking operation. Thus, the regulator 40 acts to control the hydraulic power pressure applied thereto from the hydraulic power pressure source 30 through the passage P10 and the power passage P1 in dependence upon the hydraulic pressure of the power chamber 11c thereby to modulate the hydraulic power pressure approximately to the same value as the master cylinder pressure in the pressure chamber 12a of the master cylinder 12.

The regulator valve 40 includes a housing 40A formed with four ports for connection to the passage P8, P9, P10 and an output hydraulic pressure passage P2 and being provided therein with a piston 41, a plunger member 41, a ball valve member 43 and the springs 44, 45 and 46. The piston 41 and the plunger member 42 are axially movably disposed within the housing 40A to subdivide the interior of the housing 40A into a pilot chamber 40a and fluid chambers 40b and 40c. In this embodiment, the pilot chamber 40a and fluid chamber 40c are connected to the passage P8 and the output hydraulic pressure passage P2, respectively. The piston 41 is formed with a passage 41a for permitting the flow of fluid passing therethrough from the fluid chamber 40b to the passage P11 connected to the drain passage P0. The ball valve member 43 and the spring 46 constitute a check valve, and the ball valve member 43 is normally seated on a seat portion 40A1 by the spring 46 so as to shut off the communication between the fluid chamber 40c and the passage P10 connected to the power passage P1. The plunger member 42 is provided with a valve portion 42b for closing and opening the passage 41a of the piston 41 and a rod portion 42c for seating and separating the ball valve member 43 on or from the seat portion 40A1 of the housing 40A. The plunger member 42 is further formed with an axial passage 42a for permitting the flow of the fluid under pressure passing therethrough from the fluid chamber 40c to the fluid chamber 40b. The spring 44 is disposed in the fluid chamber 40b and urges the piston 41 toward the direction in which the fluid chamber 40b communicates with the passage P11. The spring 45 is disposed in the fluid chamber 40c and urges the plunger member 42 toward the direction in which the ball valve member 43 is not separated from the seat portion 40A1 by the rod portion 42c. During non-braking operation, the regulator valve 40 holds the position as shown in FIG. 1.

When the pressure in the pilot chamber 40a increases at a predetermined value which is determined by the load of the spring 44 relative to the pressure in the fluid chambers 40b and 40c in braking operation, the piston 41 is moved leftward to close the passage 41a by engagement with the valve portion 42b of the plunger member 42, and in turn, the plunger member 42 is moved leftward to separate the ball valve member 43 from the seat portion 40A1. As a result, the fluid under pressure from the passage P10 flows into the fluid chamber 40b through the fluid chamber 40c and the passage 42a to increase the pressure in the fluid chamber 40b. This causes the pressure in the fluid chamber 40b to correspond with the pressure in the pilot chamber 40a. When the force which the pressure in the fluid chamber 40b and the load of the spring 44 exert on the piston 41 in the rightward direction increases to a magnitude larger than the force exerted on the piston 41 by the pressure in the fluid chamber 40a, the piston 41 is moved in rightward direction, as shown in FIG. 1, to open the passage 41a, and in turn, the ball valve member 43 is seated on the seat portion 40A1 to interrupt the flow of fluid under pressure into the fluid chamber 40c from the passage P10. As a result, the fluid under pressure in the fluid chamber 40b is discharged into the reservoir R through the passage 41a and the passage P11 to decrease the pressure in the fluid chambers 40b and 40c to correspond with the pressure in the pilot chamber 40a.

The changeover valve 50 is disposed near the regulator valve 40. The changeover valve 50 is a three-port, two-position solenoid operated directional control valve. A first port 50a of the changeover valve 50 is connected to the power chamber 11c of the hydraulic booster 11 through the passage P8, its second port 50b is connected to the pilot chamber 40a of the regulator valve 40 and its third port 50c is connected to the accumulator 31 through a reducing valve 70 and the passages P9 and P1. The changeover valve 50 is selectively placed in one of a first operating position and a second operating position. In its first operating position or its normal position, the first port 50a and the second port 50b are communicated with each other and third port 50c is closed, so that the power chamber 11c of the hydraulic booster 11 is communicated with the pilot chamber 40a of the regulator valve 40 through the passage P8 when the brake pedal 20 is not depressed. In the second operating position, the first port 50a is closed and the second port 50b and the third port 50c are communicated with each other, so that the pilot chamber 40a of the regulator valve 40 is communicated with the accumulator 31 through the reducing valve 70 and the passages P9 and P1 even when the brake pedal 20 is not depressed. The solenoid of the changeover valve 50 is energized in response to the electric control signal from the controller 60 when the brake pedal 20 is not depressed. In an inoperative condition of the changeover valve 50 (i.e., where its solenoid is not energized), therefore, the changeover valve 50 is placed in the first operating position, whereas in its operative condition (i.e., where its solenoid is energized), it is placed in the second operating position.

The reducing valve 70 includes a housing 71 formed with two ports, a ball valve member 72 disposed in the housing 71 and a spring 73 urged the ball valve member 72 toward the seat portion formed in the housing 71. The reducing valve 70 reduces the hydraulic power pressure supplied from the accumulator 31 to the pilot chamber 40a of the regulator valve 40 at the predetermined value when the changeover valve 50 is placed in the second operating position.

The master cylinder 12 has a master piston 12b which defines the pressure chamber 12a within the housing of the pressure generator 10. The master piston 12b is connected to and is moved by the power piston 11d. When the plunger 11a is moved and the control valve 11b is operated in response to depression of the brake pedal 20, the hydraulic pressure in the power chamber 11c, which is controlled into the controlled hydraulic pressure, is applied to the power piston 11d, so that the master piston 12b is moved toward the pressure chamber 12a. When the hydraulic power pressure from the accumulator 31 is applied to the power chamber 11c, the power piston 11d also moves the master piston 12b toward the pressure chamber 12a. Accordingly, a hydraulic pressure generated in the pressure chamber 12a corresponds to the hydraulic pressure in the power chamber 11c.

The output hydraulic pressure passage P2 of the regulator valve 40 is communicated with wheel brake cylinders 81 and 82, which are provided on wheels A and B, respectively, through a pair of two-port, two-position solenoid operated valves for supplying the hydraulic pressure (hereinafter referred to simply as supply valves) 51 and 52, respectively. The supply valve 51 is provided together with a check valve V1 in a passage P3 connecting the output hydraulic pressure passage P2 to the wheel brake cylinder 81. In its inoperative condition, the output hydraulic pressure passage P2 and the wheel brake cylinder 81 are communicated with each other. In its operative condition, the communication between the output hydraulic pressure passage P2 and the wheel brake cylinder 81 is blocked. The supply valve 52 is provided together with a check valve V2 in a passage P4 connecting the output hydraulic pressure passage P2 to the wheel brake cylinder 82. In its inoperative condition, the output hydraulic pressure passage P2 and the wheel brake cylinder 82 are communicated with each other. In its operative condition, the communication between the output hydraulic pressure passage P2 and the wheel brake cylinder 82 is blocked.

The pressure chamber 12a of the master cylinder 12 is communicated with wheel brake cylinders 83 and 84, which are provided on road wheels C and D respectively, through supply valves 53 and 54 respectively and a supplying changeover valve 59. The supply valve 53 is provided together with a check valve V3 in a passage P5 connecting the supplying changeover valve 59 to the wheel brake cylinder 83. In its inoperative condition, the supplying changeover valve 59 and the wheel brake cylinder 83 are communicated with each other. In its operative condition, the communication between the supplying changeover valve 59 and the wheel brake cylinder 53 is blocked. The supply valve 54 is provided together with a check valve V4 in a passage P6 connecting the supplying changeover valve 59 to the wheel brake cylinder 84. In its inoperative condition, the supplying changeover valve 59 and the wheel brake cylinder 84 are communicated with each other. In its operative condition, the communication between the supplying changeover valve 59 and the wheel brake cylinder 84 is blocked. The supply valves 51 to 54 are operated in response to the electric control signal from the controller 60.

The wheel brake cylinders 81, 82, 83 and 84 are each connected to the reservoir R through a two-port, two-position solenoid operated valve for discharging the hydraulic pressure from the wheel brake cylinders (hereinafter referred to as discharge valve) 55, 56, 57 and 58, respectively. The discharge valves 55 to 58 are operated in response to the electric control signal from the controller 60. In the operative condition of the discharge valve 55, the wheel brake cylinder 81 and the reservoir R are communicated with each other, whereas the communication therebetween is blocked in its inoperative condition, and other discharge valves 56, 57 and 58 function similarly.

The supplying changeover valve 59 is a three-port, two-position solenoid operated directional control valve arranged to be energized in response to the electric control signal from the controller 60 and is disposed in the passage P7 connecting the supply valves 53 and 54 to the pressure chamber 12a of the master cylinder 12. A first port of the supplying changeover valve 59 is connected to the pressure chamber 12a, while a second port of the valve 59 is connected to the supply valves 53 and 54, and a third port of the valve 59 is connected to the output hydraulic pressure passage P2. The supplying changeover valve 59 is selectively placed in one of a first operating position and a second operating position. In its first operating position or its normal position, the first port and the second port are communicated with each other and the third port is closed, so that the pressure chamber 12a is communicated with the wheel brake cylinders 83 and 84 through the supply valves 53 and 54, respectively. In the second operating position, the communication between the pressure chamber 12a and the supply valves 53 and 54 is closed and the output hydraulic pressure passage P2 is communicated with the wheel brake cylinders 83 and 84.

The supplying changeover valve 59 is so controlled as to be energized prior to the operation of the discharge valve 57 and 58 the anti-locking operation, which is described later, so that the brake pedal 20 is held in a position at the time of braking during the anti-locking operation, so as to prevent an excessive depression of the brake pedal 20 and the unpleasant shock thereon.

In operation, when the brake pedal 20 is depressed during a braking operation, the changeover valve 50 is in its inoperative condition and the hydraulic braking system according to this embodiment operates as follows.

When the wheels A to D are not in a locking condition, the supplying changeover valve 59, the supply valves 52 to 54 and the discharge valves 55 to 58 ar in their inoperative condition as shown in FIG. 1. Accordingly, the output hydraulic pressure of the regulator valve 40 which regulates the hydraulic power pressure from the accumulator 31 in dependence upon the hydraulic pressure of the power chamber 11c and modulated the hydraulic power pressure approximately to the same value as the master cylinder pressure in the pressure chamber 12a of the master cylinder 12 is applied to the wheel cylinders 81 and 82. The master cylinder 12 is, therefore, activated to generate from the pressure chamber 12a the hydraulic pressure which is applied to the wheel brake cylinders 83 and 84.

When some of the wheels A to D are in a particular locking condition, the supplying changeover valve 59 is operated to be placed in its second operating position and then the supply valves 51 to 54 and the discharge valves 55 to 58 are operated by the controller 60 depending on the locking condition, so that the hydraulic pressure in each of the wheel cylinders 81 to 84 is increased or decreased to effectively prevent the wheels A to D from locking. Accordingly, since the supplying changeover valve 59 is placed in its second operating position and the output hydraulic pressure of the regulator is applied to the wheel brake cylinders 81 to 84, the anti-locking operation is achieved without causing an excessive depression of the brake pedal 20, an unpleasant shock on the brake pedal 20 or a difficulty of the control of the anti-locking operation.

In the case where the brake pedal 20 is not depressed, the hydraulic braking system operates as follows.

When the changeover valve 50 is in its inoperative condition, the pressure generator 10 and the master cylinder 12 are held inoperative, and the regulator valve 40 is held inoperative, so that no hydraulic pressure is applied to any one of the wheel brake cylinders 81 to 84.

When the driven wheels of the wheels A to D are in the slip condition during a starting or accelerating operation, the changeover valve 50 is operated to be placed in its second operating position and the supply and the discharge valves 51 to 58 and the supplying changeover valve 59 are operated by the controller 60 depending on the slip condition of the driven wheels, so that only driven wheels are braked without depression of the brake pedal 20, effectively preventing the slip. Accordingly, the anti-slip operation is achieved.

For example, where the wheels A and B are rear driven wheels, the anti-slip operation may be obtained by rendering the changeover valve 50 operative, and operating the discharge valves 55 and 56 (the supply valves 51 and 52 as well, if necessary) in response to the slip condition. Where the wheels C and D are front driven wheels, the anti-slip operation may be obtained by rendering the changeover valve 50, supplying changeover valve 59 and setting the supply valves 51, 52 to the operative position (the discharge valves 55, 56 as well, if necessary), and operating the discharge valves 57, 58 (the supply valves 53, 54 and supplying changeover valve 59 as well, if necessary) in response to the slip condition. Where all of the wheels A to D are driven wheels, anti-slip operation may be obtained by operating the changeover valve 50 and the supplying changeover valve 59, and operating the discharge valves 55 to 58 (the supply valve 51 to 54 as well, if necessary) in response to the slip condition.

Further, when an obstacle is sensed by a sensor (not shown) during the driving of the vehicle, the changeover valve 50 and the supplying changeover valve 59 (the each valves 51 to 58 as well, if necessary) may be operated suitably by the controller 60 in response to the signal from the sensor, so that a suitable hydraulic pressure is applied to all the wheel brake cylinders 81 to 84 to accurately stop the vehicle without depression of the brake pedal 20. That is, an auto-braking operation may be achieved.

As is apparent from the foregoing description, with reference to the above-described embodiment of the hydraulic braking system according to the present invention, since the above hydraulic braking system is constituted by adding only one changeover valve 50 to the known system having a regulator valve, it is possible to prevent the scaling up of the system. Further, in this embodiment, a hydraulic pressure may be applied to all wheel brake cylinders 81 to 84 without depression of the brake pedal 20 by operation of the changeover valve 50 and the supplying changeover valve 59. Therefore, even in the case of a vehicle adopting the diagonal dual circuit, or irrespective of which of the wheels are driven in a front-drive, a rear-drive or four wheel-drive vehicle, the present system may be employed without changing any of the components but by merely suitably modifying the method for controlling the changeover valve 50, supplying changeover valve 59 and the valves 51 to 58 by the controller 60. Further, in this embodiment, since the power hydraulic pressure reduced by the reducing valve 70 is supplied to the pilot chamber 40a of the regulator valve 40 when the changeover valve 50 is operated, the output hydraulic pressure generated into the output hydraulic pressure passage P2 is reduced as compared to the power hydraulic pressure in the accumulator 31. Therefore, it is able to simplify the controls in the anti-slip operation and the auto-braking operation.

Figure 2:
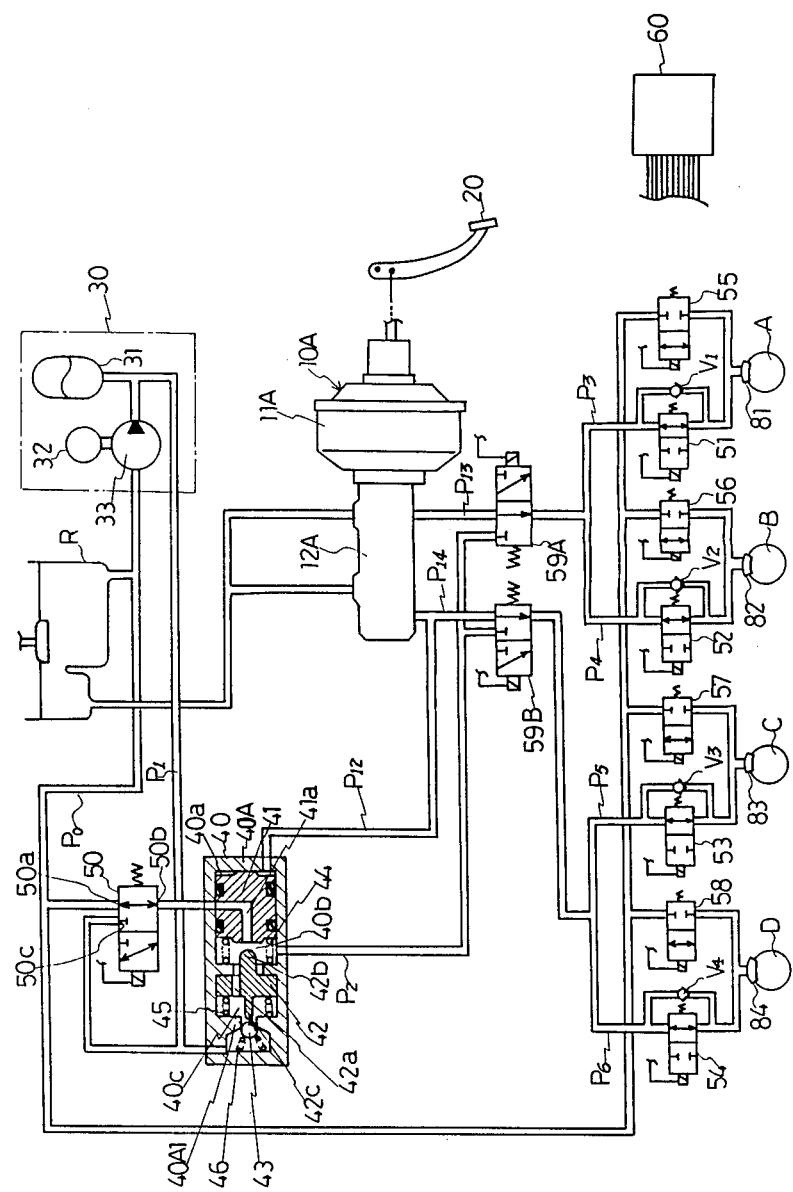
FIG. 2 is a schematic illustration of a hydraulic braking system according to a second embodiment of the present invention.

Referring to the FIG. 2, there is schematically illustrated a hydraulic braking system according to a second embodiment of the present invention. In this embodiment, the pressure generator 10A comprises a vacuum brake booster 11A and a tandem master cylinder 12A operated by the vacuum brake booster 11A. Further, a pair of supplying changeover valves 59A and 59B is disposed between the pressure chamber of the tandem master cylinder 12A and each of the wheel brake cylinders 81 to 84. The supplying changeover valves 59A and 59B are each a three-port, two-position solenoid operated directional control valve. A first port of the supplying changeover valve 59A is connected to the one pressure chamber of the tandem master cylinder 12A through a passage P13, its second port is connected to the wheel brake cylinders 81 and 82 through the passages P3 and P4 and the supply valves 51, 52, respectively and its third port is connected to the output hydraulic pressure passage P2. The supplying changeover valve 59A is selectively placed in one of a first operating position and a second operating position. In its first operating position or its normal position, the first and second ports are communicated with each other and the third port is blocked. In the second operating position, the first port is blocked and the second and third ports are communicated with each other. A first port of the supplying changeover valve 59B is connected to another pressure chamber of the tandem master cylinder 12A through a passage P14, its second port is connected to the wheel brake cylinders 83, 84 through the passages P5, P6 and the supply valves 53, 54, respectively and its third port is connected to the output hydraulic pressure passage P2. The supplying changeover valve 59B is selectively placed in one of a first operating position and a second operating position. In its first operating position, the first and second ports are communicated with each other and the third port is blocked. In the second operating position, the first port is blocked and the second and third ports are communicated with each other.

The pilot chamber 40a of the regulator valve 40 is communicated with the other pressure chamber of the tandem master cylinder 12A through a passage P12 and the output hydraulic pressure passage P2 is communicated with the fluid chamber 40b of the regulator valve 40. The changeover valve 50 which generates the hydraulic power pressure from the accumulator 31 at the output hydraulic pressure passage P2 in response to the electric signal from the controller 60 when the brake pedal is not depressed is disposed in the drain passage P0. In its inoperative condition, the drain passage P0 is communicated with the fluid chamber 40b through the passage 41a of the piston 41. In its operative condition, the power passage P1 is communicated with the fluid chamber 40b through the passage 41a.

In this second embodiment, the other structure illustrated is equal to the first embodiment shown in FIG. 1 and the same effects are obtained.

Figure 3:
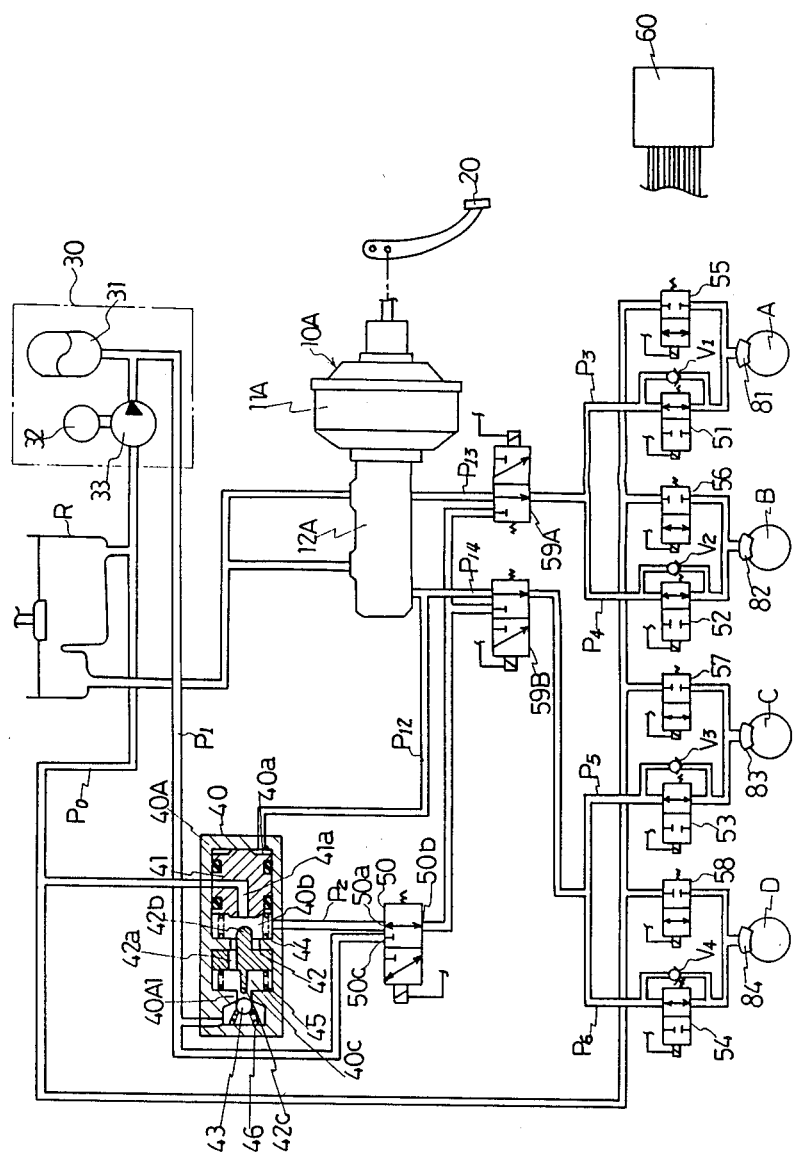
FIG. 3 is a schematic illustration of a hydraulic braking system according to a third embodiment of the present invention.

Referring to FIG. 3, there is schematically illustrated a hydraulic braking system according to a third embodiment of the present invention. In this embodiment, the changeover valve 50 is disposed in the output hydraulic pressure passage P2. In its inoperative condition, the fluid chamber 40b is communicated with the output hydraulic pressure passage P2. In its operative condition, the output hydraulic pressure passage P2 is communicated with the power passage P1. In this embodiment, the other structure shown is equal to the second embodiment shown in FIG. 2 and the same effects are obtained.

In the above embodiments, a three-port, two-position solenoid operated directional control valve is adopted as the changeover valve 50. However, this changeover valve 50 may be replaced by two sets of two-port, two-position solenoid operated shut-off valves.

Further, in the above embodiments, the power hydraulic pressure source 30 having the accumulator 31, the motor 32 and the fluid pump 33 is adopted as the power hydraulic pressure source 30. However, it is possible to embody the present invention by adopting other power hydraulic pressure sources.

Further, in the above embodiments the supply valves 51 to 54 and the discharge valves 55 to 58 are adopted as the valve means for controlling the communication between each wheel brake cylinder of 81 to 84 and the hydraulic braking pressure generator 10 and the communication between each wheel brake cylinder and the reservoir R connected thereto and the communication between each wheel brake cylinder and the regulator valve 40 connected thereto. Instead of the combination of the supply valves 51 to 54 and the discharge valves 55 to 58, a three-port, two-position solenoid operated directional control valve may be employed in each wheel brake cylinder.

Having now fully set forth both the structure and operation of the preferred embodiments of the present invention, various other embodiments as well as certain various modifications of the embodiment herein shown and described will obviously occur to those skilled in the art upon becoming familiar with the underlying concept. It is to be understood, therefore, that with the scope of the appended claims, the invention maybe practiced otherwise than as specifically set forth herein.

What is claimed is:

1. A hydraulic braking system for a vehicle having a plurality of wheels and a brake pedal for activating the system, the system comprising:

hydraulic power pressure producing means for producing a hydraulic power pressure;

hydraulic braking pressure generating means for generating a hydraulic pressure in response to the operation of the brake pedal;

an output hydraulic pressure passage;

regulator valve means for regulating, in dependence upon the operation of said hydraulic braking pressure generating means, said hydraulic power pressure which is supplied form said hydraulic power pressure producing means and for supplying a regulated hydraulic pressure to said output hydraulic pressure passage, said regulator valve means includes a housing having an interior and including four ports connected to said hydraulic braking pressure generating means, a reservoir, said hydraulic power pressure producing means and said output hydraulic pressure passage of said regulator valve means, respectively, a piston and a plunger member being axially movably disposed within said housing to subdivide the interior of said housing into a pilot chamber which is communicated with said hydraulic braking pressure generating means and fluid chambers which communicate with said output hydraulic pressure passage, a check valve being associated with said piston and said plunger member to control the communication between said hydraulic power pressure producing means and said fluid chambers, and wherein a control means is provided for controlling the communication between said reservoir and said fluid chambers;

said reservoir provided for storing an amount of the hydraulic fluid;

a plurality of wheel brake cylinders for braking the wheels, said wheel brake cylinders being connected to said hydraulic braking pressure generating means and said reservoir, and being connected to said regulator valve means through said output hydraulic pressure passage;

control valve means for controlling the communication between said hydraulic braking pressure generating means and said wheel brake cylinders, between said regulator valve means and said wheel brake cylinders and between said reservoir and said wheel brake cylinders; and a changeover valve selectively positionable in a first operating position for blocking the communication between said power hydraulic pressure producing means and said output hydraulic pressure passage of said regulator valve means and a second operating position for introducing said hydraulic power pressure which is supplied from said hydraulic power pressure producing means to said output hydraulic pressure passage of said regulator valve means.

2. A hydraulic braking system for a vehicle of claim 1, wherein said changeover valve comprises a three-port two-position solenoid operated directional control valve, said directional control valve having a first port connected to said hydraulic braking pressure generating means, a second port connected to said pilot chamber of said regulator valve means and a third port connected to said hydraulic power pressure producing means, and wherein said first and second ports of said directional control valve are normally in communication with each other and said third port is normally closed, whereas said second and third ports are in communication with each other and said first port is closed when said directional control valve is energized.

3. A hydraulic braking system for a vehicle of claim 1, further including a reducing valve disposed between said changeover valve and said hydraulic power pressure producing means, said reducing valve being operable to reduce the hydraulic power pressure supplied from said hydraulic power pressure source at a predetermined value.

4. A hydraulic braking system for a vehicle of claim 1, wherein said hydraulic braking pressure generating means comprises a hydraulic booster and a single master cylinder which is assembled within said hydraulic booster, said hydraulic booster having a booster housing defining a power chamber communicating with said hydraulic power pressure producing means through a power passage and communicating with said reservoir through a drain passage, a control valve being disposed within said power chamber and connected to said power passage and said drain passage, said control valve being arranged to control the communication of said power chamber with said power passage and said drain passage in response to the depression of the brake pedal to control said hydraulic power pressure supplied from said hydraulic power pressure producing means and generate a controlled hydraulic pressure in said power chamber, said power chamber normally communicating with said drain passage when the brake pedal is in an initial position thereof, a power piston being axially movably disposed within said housing and being applied with said controlled hydraulic pressure in said power chamber, said single master cylinder having a common housing with said booster housing, a master piston defining a pressure chamber in said booster housing associated with said power piston.

5. A hydraulic braking system for a vehicle of claim 4, wherein said regulator valve means acts to control said hydraulic power pressure applied thereto from said hydraulic power pressure producing means in dependence upon said controlled hydraulic pressure of said power chamber thereby to modulate said power hydraulic pressure approximately to the same value as said master cylinder pressure in said pressure chamber of said single master cylinder.

6. A hydraulic braking system for a vehicle of claim 5, wherein said wheel brake cylinders are divided into a first group of wheel brake cylinders communicated with said output hydraulic pressure passage of said regulator valve means and a second group of wheel brake cylinders communicated with said pressure chamber of said single master cylinder.

7. A hydraulic braking system for a vehicle of claim 6, wherein said supplying changeover valve including a three-port two-position solenoid operated directional control valve disposed in a passage connecting said pressure chamber and said second group of wheel brake cylinders upstream of said control valve means, and wherein said supplying changeover 8. A hydraulic braking system for a vehicle of claim 7, wherein said supplying changeover valve is arranged to be operated before said control valve means is operative. valve normally communicates said pressure chamber with said second group of wheel cylinders, said supplying changeover valve blocking the communication therebetween and communicating said output hydraulic pressure passage with said second group wheel brake cylinders when said supplying changeover valve is energized.

9. A hydraulic braking system for a vehicle of claim 1, wherein said hydraulic braking pressure generating means comprises a vacuum booster and a tandem master cylinder which is operated by said vacuum booster and has two pressure chambers, at least one of the pressure chambers being communicated with said pilot chamber of said regulator valve means.

10. A hydraulic braking system for a vehicle of claim 9, wherein said changeover valve comprises a three-port two-position solenoid operated directional control valve, said directional control valve having a first port connected to said reservoir, a second port connected to said fluid chambers of said regulator valve and a third port connected to said hydraulic power pressure producing means, and wherein said first and second ports are normally in communication with each other and said third port is normally closed, whereas said second and third ports are in communication with each other and said first port is closed when said directional control valve is energized.

11. A hydraulic braking system for a vehicle of claim 9, wherein said changeover valve comprises a three-port two-position solenoid operated directional control valve, said directional control valve having a first port connected to said fluid chambers of said regulator valve means, a second port connected to said output hydraulic pressure passage of said regulator valve means and a third port connected to said hydraulic power pressure producing means, and wherein said first and second ports are normally in communication with each other and said third port is normally closed, whereas said second and third ports are in communication with each other and said first port is closed when said directional control valve is energized.

12. A hydraulic braking system for a vehicle of claim 9, wherein said wheel brake cylinders are divided into a first group of wheel brake cylinders in communication with one of said two pressure chambers and a second group of wheel brake cylinders in communication with another of said two pressure chambers, and wherein a supplying changeover valve is disposed in a respective passage connecting each of said pressure chambers and the corresponding group of wheel brake cylinders, said supplying changeover valve including a three-port two-position solenoid operated directional control valve, and wherein said supplying changeover valve normally communicates each of said pressure chambers with the corresponding group of wheel brake cylinders, said supplying changeover valve blocking the communication therebetween and communicating said respective group of wheel brake cylinders with said output hydraulic pressure passage of said regulator valve means when said supplying changeover valve is energized.

13. A hydraulic braking system for a vehicle of claim 1, wherein said hydraulic power pressure source comprises a fluid pump connected to said reservoir and driven by a motor, and an accumulator connected to said fluid pump which is also connected to said hydraulic pressure generating means.

14. A hydraulic braking system for a vehicle having a plurality of wheels and a brake pedal for activating the system, the system comprising:
hydraulic power pressure producing means for producing a hydraulic power pressure;
hydraulic braking pressure generating means for generating a hydraulic pressure in response to the operation of the brake pedal;
an output hydraulic pressure passage;
a reservoir for storing an amount of the hydraulic fluid;
regulator valve means for regulating, in dependence upon the operation of said hydraulic braking pressure generating means, said hydraulic power pressure which is supplied from said hydraulic power pressure producing means and for supplying a regulated hydraulic pressure to said output hydraulic pressure passage, said regulator valve means includes a housing having an interior and including four ports connected to said hydraulic braking pressure generating means, said reservoir, said hydraulic power pressure producing means and said output hydraulic pressure passage of said regulator valve means, respectively, a subdividing means being axially movably disposed within said housing for subdividing the interior of said housing into a pilot chamber which is communicated with said hydraulic braking pressure generating means and fluid chambers which communicate with said output hydraulic pressure passage, valve means associated with said subdividing means for controlling the communication between said hydraulic power pressure producing means, said fluid chambers, and said reservoir;
a plurality of wheel brake cylinders for braking the wheels, said wheel brake cylinders being connected to said hydraulic braking pressure generating means and said reservoir, and being connected to said regulator valve means through said output hydraulic pressure passage;
control valve means for controlling the communication between said hydraulic braking pressure generating means and said wheel brake cylinders, between said regulator valve means and said wheel brake cylinders and between said reservoir and said wheel brake cylinders; and
a changeover valve selectively positionable in a first operating position for blocking the communication between said power hydraulic pressure producing means and said output hydraulic pressure passage of said regulator valve means and a second operating position for introducing said hydraulic power pressure which is supplied from said hydraulic power pressure producing means to said output hydraulic pressure passage of said regulator valve means.

* * * * *